United States Patent
Parikh (10) Patent No.: US 11,552,799 B1
(45) Date of Patent: Jan. 10, 2023

(54) STORAGE ARCHITECTURE PROVIDING IMPROVED MODIFICATION OF ACCESS RIGHTS FOR STORED DATA

(71) Applicant: Player Tokens, Inc., Seattle, WA (US)

(72) Inventor: Kush G. Parikh, Seattle, WA (US)

(73) Assignee: Player Tokens, Inc., Seattle, WA (US)

( * ) Notice: Subject to any disclaimer, the term of this patent is extended or adjusted under 35 U.S.C. 154(b) by 357 days.

(21) Appl. No.: 16/673,989

(22) Filed: Nov. 5, 2019

Related U.S. Application Data (60) Provisional application No. 62/755,986, filed on Nov. 5, 2018.

(51) Int. Cl.
| | |
|---|---|
| *H04L 29/06* | (2006.01) |
| *H04L 9/32* | (2006.01) |
| *H04L 9/06* | (2006.01) |
| *H04L 9/40* | (2022.01) |
| *G06F 16/23* | (2019.01) |

(52) U.S. Cl.
CPC ........ *H04L 9/3234* (2013.01); *G06F 16/2365* (2019.01); *G06F 16/2379* (2019.01); *H04L 9/0637* (2013.01); *H04L 63/102* (2013.01)

(58) Field of Classification Search
CPC ... H04L 9/3234; H04L 9/0637; H04L 63/102; G06F 16/2365; G06F 16/2379
See application file for complete search history.

(56) References Cited

U.S. PATENT DOCUMENTS

| | | | |
|---|---|---|---|
| 2017/0221288 A1* | 8/2017 | Johnson | G07C 9/257 |
| 2018/0144156 A1* | 5/2018 | Marin | H04L 9/34 |
| 2019/0028276 A1* | 1/2019 | Pierce | G06Q 20/02 |
| 2019/0180291 A1* | 6/2019 | Schmeling | G16H 20/10 |
| 2019/0188701 A1* | 6/2019 | Parsons | H04L 9/3239 |
| 2020/0035341 A1* | 1/2020 | Kain | G16H 10/60 |
| 2020/0038761 A1* | 2/2020 | Packin | A63F 13/792 |
| 2020/0074853 A1* | 3/2020 | Miller | H04W 4/02 |

(Continued)

OTHER PUBLICATIONS

Tiwari, "ERC Token Standards for Dummies, Like Me", retrieved on Sep. 6, 2018 from https://medium.com/techracers/erc-token-standards-for-dummies-like-me-b6b8ace0f303, 19 pages.

(Continued)

*Primary Examiner* — Mahfuzur Rahman
(74) *Attorney, Agent, or Firm* — VLP Law Group LLP; James A. D. White (57) ABSTRACT

A storage architecture and associated usage techniques are described for providing efficient modification and use of access rights for stored data. The access rights may be associated with data stored on blockchain storage, and a separate ledger storage system may be used to provide improvements for modifying access rights for such stored data. For example, groups of data may be created and stored on blockchain storage before access to the stored data groups is made available to end users, and additional information related to those stored data groups (e.g., about their access rights) may be stored in a separate ledger storage system. When a particular user later requests access rights for one of those previously stored data groups, corresponding modifications may be quickly made to the separate ledger storage system to provide the user with substantially immediate access to that stored data group.

21 Claims, 3 Drawing Sheets

(56) References Cited

U.S. PATENT DOCUMENTS

| | | | | |
|---|---|---|---|---|
| 2020/0099512 | A1* | 3/2020 | Kikinis | H04L 9/0637 |
| 2020/0273578 | A1* | 8/2020 | Kutzko | G16H 50/30 |
| 2020/0311721 | A1* | 10/2020 | Ow | G06Q 20/367 |
| 2020/0394626 | A1* | 12/2020 | Kikinis | G06Q 20/223 |
| 2021/0073212 | A1* | 3/2021 | Conley | G06F 16/27 |
| 2021/0201336 | A1* | 7/2021 | Mallett | G06F 3/011 |
| 2021/0326857 | A1* | 10/2021 | Yantis | G06Q 20/065 |

OTHER PUBLICATIONS

Brenn, "Noobs Guide to Understanding ERC-20 vs ERC-271 Tokens," retrieved on Sep. 6, 2018 from https://medium.com/blocksimple/noobs-guide-to-understanding-erc-20-vs-erc-721-tokens-d7f5657a. . . , 5 pages.

"eth.town / Heading to the launch on Aug 21", retrieved on Sep. 6, 2018 from https://medium.com/@ethtown/eth-town-heading-to-the-launch-on-aug-2-b213342f7564, 12 pages.

Gianni Settino, "Why We're Putting Sports Cards on the Blockchain", retrieved on Sep. 6, 2018 from https://medium.com/cryptostrikers/why-were-putting-sports-cards-on-the-blockchain-c00112150033, 5 pages.

Wikipedia Ethereum, retrieved on Sep. 6, 2018 from https://en.wikipedia.org/wiki/Ethereum, 13 pages.

Wikipedia ERC-20, retrieved on Sep. 6, 2018 from https://en.wikipedia.org/wiki/ERC-20, 2 pages.

Wikipedia Blockchain, retrieved on Sep. 6, 2018 from https://en.wikipedia.org/wiki/Blockchain, 13 pages.

Wikipedia Digital Asset, retrieved on Sep. 6, 2018 from https://en.wikipedia.org/wiki/Digital_asset, 2 pages.

Wikipedia CryptoKitties, retrieved on Sep. 6, 2018 from https://en.wikipedia.org/wiki/CryptoKitties, 3 pages.

* cited by examiner

Fig. 2 ical Field

The following disclosure relates generally to a storage architecture that provides efficient modification and use of access rights for stored data, such as for data that is stored at least in part on a distributed blockchain and based at least in part on using a separate ledger storage system to improve data access operations.

BACKGROUND

Managing access to stored data is becoming increasingly difficult in many situations, such as due to proliferation of devices and locations in which data may be stored, as well as use of more complicated storage mechanisms (e.g., distributed storage mechanisms). One type of difficulty that arises involves managing which users have which access rights for particular pieces or groups of stored data, and doing so as rapidly and accurately as possible.

DETAILED DESCRIPTION

A storage architecture and associated usage techniques are described for providing efficient modification and use of access rights for stored data. In at least some embodiments, the access rights are associated with data that is stored at least in part on distributed blockchain storage, and a ledger storage system separate from the blockchain storage is used to provide improvements (e.g., to improve the speed of operations) for modifying access rights for such stored data (e.g., which users have read and/or write access rights to particular stored data groups, which users have ownership access rights for particular stored data groups, etc.). For example, in at least some such embodiments, multiple groups of unique data are created and stored on blockchain storage before access to the stored data groups is requested by or otherwise made available to end users, and additional information related to those stored data groups is stored in a separate ledger storage system, including information about access rights for those stored data groups. When a particular user later requests access rights for one of those previously stored data groups, corresponding modifications may be quickly made to the separate ledger storage system to provide the user with immediate or substantially immediate access to that stored data group, with a corresponding access right update optionally later added to the blockchain storage for that stored data group. Such a hybrid storage architecture provides various benefits, such as by the blockchain storage providing verifiable information about a stored group of data (e.g., about the creation and/or modification of the stored group of data), while the separate ledger system provides benefits with respect to modifying access rights for the stored group of data (e.g., greater speed, more flexibility in types of data access rights, etc.). In at least some embodiments, the described techniques are performed by automated operations of a computer-implemented Token Ledger Management (TLM) system, as discussed in greater detail below.

As noted above, distributed blockchain storage is used in at least some embodiments to store at least some data used with the described techniques, such as by using a bitcoin-based blockchain storage and/or an Ethereum-based blockchain storage and/or another type of blockchain storage. In order for an end user to own a digital cryptographic token corresponding to a group of data stored on blockchain storage (e.g., an Ethereum ERC-271 token, an Ethereum ERC-20 token, etc.), at least some prior systems required the end user to first create a digital crypto-wallet for that type of blockchain and to acquire some type of digital currency or other digital credit (e.g., proof-of-work, proof-of-stake, etc.) that is used to submit a transaction to that blockchain, before a transaction for the end user to own the digital token can occur. Conversely, in at least some embodiments using the described storage architecture and associated usage techniques, the use of the separate ledger storage system enables the TLM system to store and maintain access rights information separate from the blockchain system (optionally along with additional types of stored data, as discussed further below), so that the end user may perform activities to own a digital token or other associated access rights for a group of data stored on blockchain storage but without needing such a digital wallet or digital credit.

For illustrative purposes, some embodiments are described below in which specific types of operations are performed, including with respect to particular types of stored data, types of storage systems, types of access rights and associated modifications, etc. For example, the blockchain storage used in some examples below is the Ethereum blockchain, although other blockchain systems or other types of distributed storage may be used in other embodiments. These examples are provided for illustrative purposes and are simplified for the sake of brevity, and the inventive techniques may be used in a wide variety of other situations, including with other types of modifications of access rights to stored data and other types of uses of stored data, some of which are discussed below—accordingly, it will be appreciated that the described techniques are not limited to use with the example embodiments discussed below.

Figure 1A:
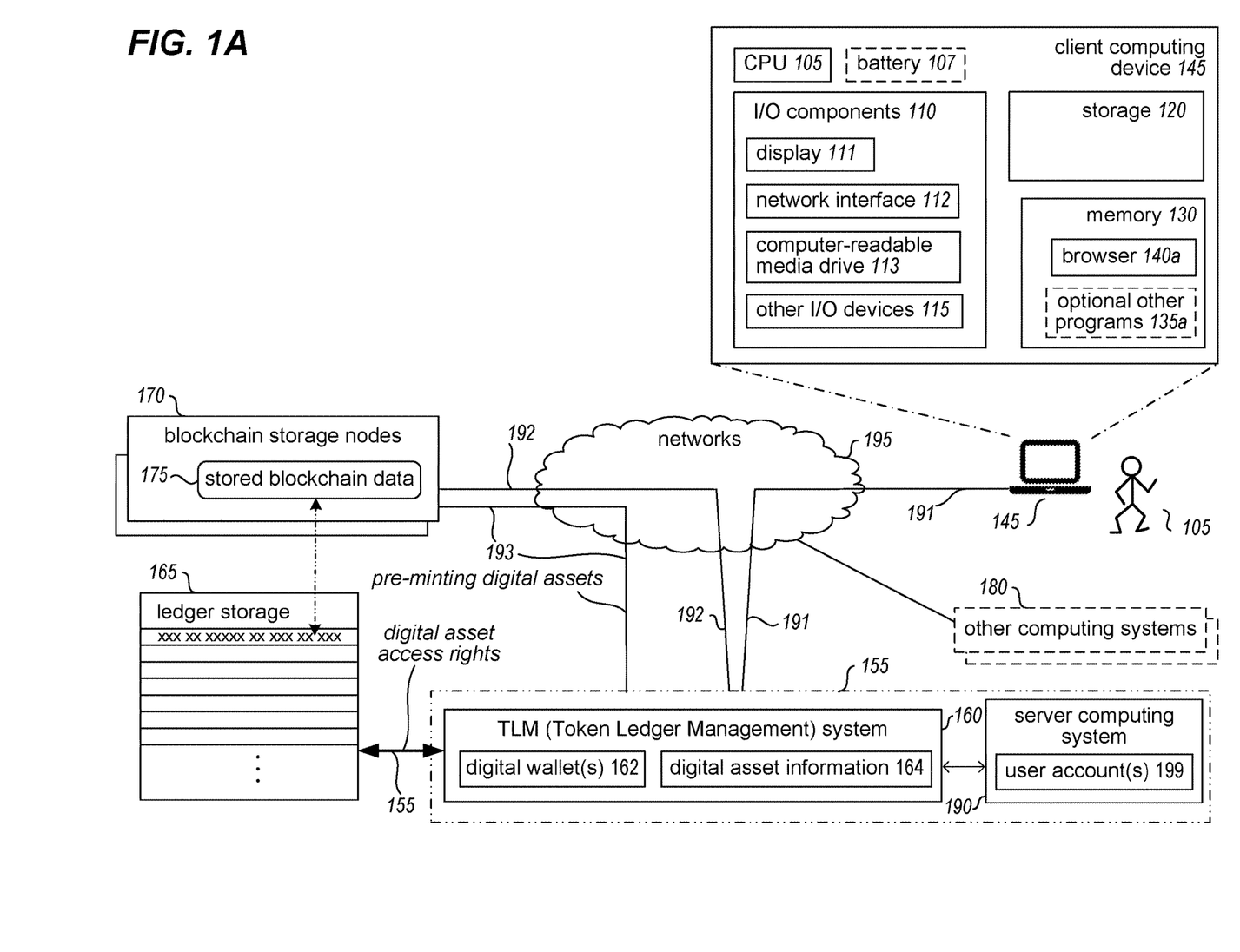
FIG. 1A is a network diagram illustrating an example environment in which a Token Ledger Management (TLM) System is provided and used for controlling access rights to digital assets stored at least in part on blockchain storage, including illustrating example computing systems suitable for executing an embodiment of such a system.
Figure 1B:
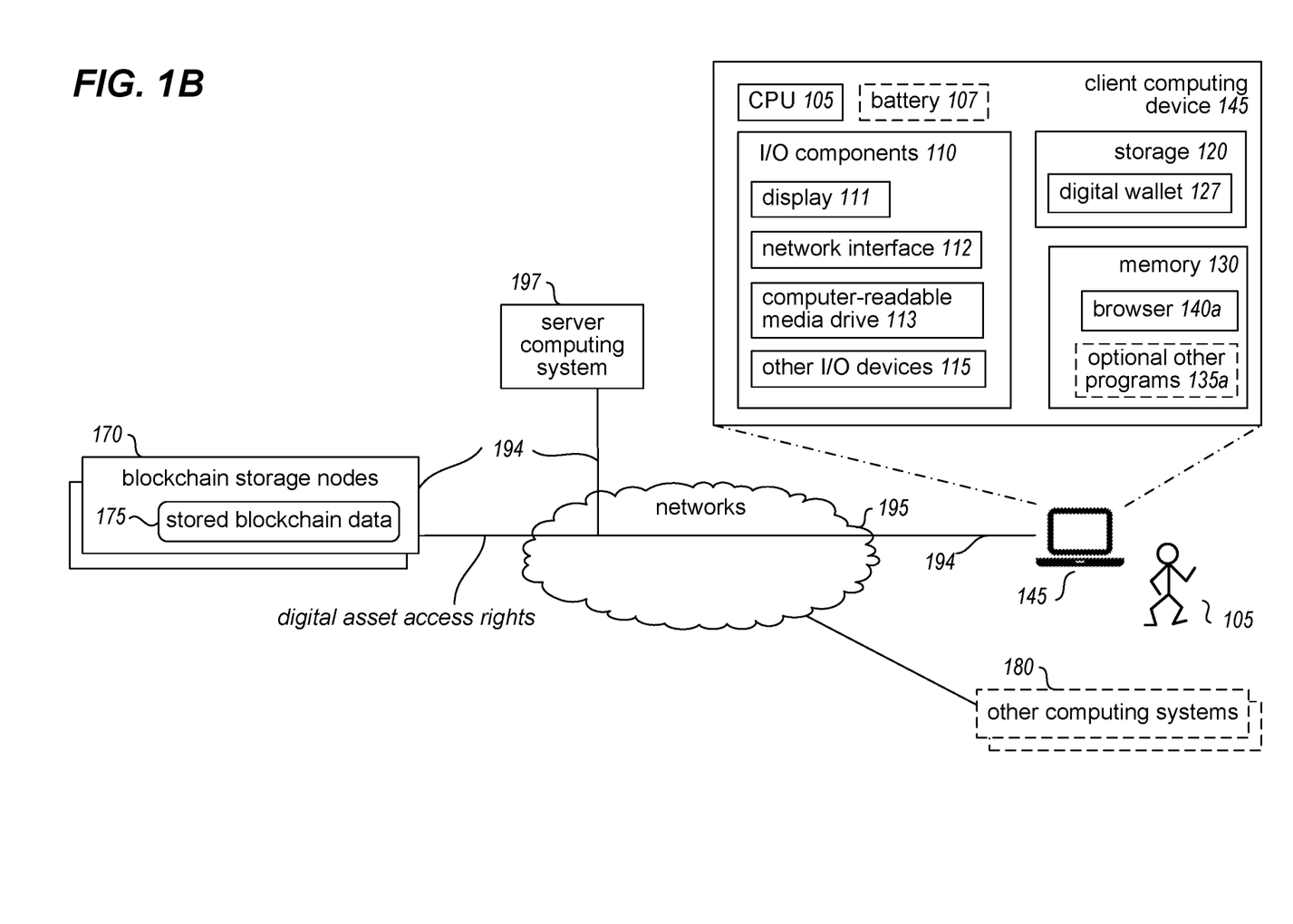
FIG. 1B is a network diagram illustrating an example environment of managing access rights to digital assets stored on blockchain storage without using functionality of a Token Ledger Management (TLM) System.

FIG. 1B is a network diagram illustrating an example environment of managing access for digital information that is stored on a blockchain without using functionality of a TLM system—in particular, in this example of how some prior systems operate, an end user must create a digital wallet for a type of blockchain storing the digital information, and must further acquire some type of digital currency or other digital credit for that blockchain in order to submit a transaction to that blockchain, such as to store a group of data for which the end user has ownership access rights.

In particular, FIG. 1B illustrates an example end user 105 who has a client computing device 145 (e.g., a laptop, desktop, smart phone, tablet, etc.) with capabilities for communicating over one or more networks 195 (e.g., the Internet) to communicate with other computing and storage systems, such as a remote server computing system 197, one or more blockchain storage nodes 170, and/or optional other computing systems 180. The client computing device 145 is illustrated in additional detail, such as to include various hardware components, stored data and executable software instructions—each of the other computing systems and/or storage nodes may similarly include some or all such hardware components (and optionally additional hardware components), but the details are not illustrated herein for the other computing systems for the sake of brevity. In particular, the example device 145 includes one or more hardware central processing unit ("CPU") processors 105, various hardware input/output ("I/O") components 110, storage 120, memory 130 and optionally one or more batteries 107. Illustrated I/O components in this example embodiment include a display 111, a network connection interface 112, a computer-readable media drive 113, and other I/O devices 115 (e.g., wireless or attached keyboards, mice or other pointing devices, microphones, speakers, cameras, other sensors, etc.). Other types of hardware components may additionally be present (e.g., other processors, such as a GPU, or graphics processing unit; a GPS, or global positioning system, transceiver and/or other location-determination sensors; one or more IMUs, or internal measurement units; etc.), but are not illustrated in this example.

In this example the user has created a digital wallet 127 on storage 120, for use in storing digital tokens corresponding to data stored on the blockchain storage nodes, although in other embodiments such a digital wallet may instead be created in other manners (e.g., on one of the other computing systems 180, such as on a centralized exchange). The illustrated embodiment also includes a browser program 140a executing in memory 130 that the user uses to interact with the blockchain storage nodes and other computing systems (e.g., server computing system 197) in order to perform blockchain-based transactions, although in other embodiments the user may instead use other types of software programs to do so (e.g., one or more other optional programs 135a, such as a decentralized application). In particular, the user uses the client computing device 145 to perform one or more interactions 194 with the server computing system 197 and blockchain storage nodes 170 to obtain access rights for digital information to be stored in the blockchain data 175, such as to purchase ownership rights for digital information that is owned or otherwise controlled by server computing system 197, with that digital information then stored on the blockchain data 175 as part of an ERC-271 digital token, and with that digital token then stored in the digital wallet 127. Such a transaction may take, for example, approximately 10-15 seconds to add corresponding data to the blockchain data 175, and may involve a variety of steps taken by the user 105 beforehand to enable such a transaction to occur (e.g., creation of the digital wallet 127; acquisition of digital currency and/or other digital credits, not shown; etc.). Once the ERC-271 digital token is stored in the digital wallet 127 and corresponding digital information is stored on the blockchain storage nodes, the end user may further access and use the corresponding digital information in various manners.

In contrast to FIG. 1B, FIG. 1A illustrates a storage architecture and use of a Token Ledger Management (TLM) system to improve the control of access rights for digital assets (or other groups of digital information) that are stored at least in part on a blockchain storage. FIG. 1A includes several of the elements illustrated and discussed with respect to FIG. 1B, including a user 105 using a client computing device 145, one or more networks 195, one or more blockchain storage nodes 170 storing blockchain data 175, and optionally one or more other computing system 180. However, in the illustrated embodiment of FIG. 1A, the digital wallet 127 of storage 120 of client computing device 145 may optionally not be present or used, such as if the user 105 instead uses capabilities provided by the TLM system 160 to manage access to digital assets and other data stored by the blockchain storage nodes 170.

In particular, in this example the TLM system 160 operates in conjunction with one or more server computing systems 190 that provide an online service (not shown) available for use by various end users. In some such embodiments, the server computing system 190 and TLM system 160 may be integrated together as one system 155 (e.g., with the server computing systems 190 executing the TLM system 160), while in other embodiments the TLM system 160 may provide capabilities to multiple different server computing systems (and the multiple online services that they provide), such as over networks 195, and with the TLM system 160 being executed by one or more other computing systems (not shown). In this example, the TLM system 160 performs initial interactions 193 over the networks 195 with the blockchain storage nodes 170 in order to create various unique digital assets that are stored at least in part in the blockchain data 175, referred to herein at times as "pre-minting" the digital assets. In at least some embodiments, each such pre-minted digital asset is stored at least in part on the blockchain nodes 170 as a non-monetary, non-fungible ERC-271 digital token, and those digital tokens are stored by the TLM system in this example on one or more digital wallets 162 maintained by the TLM system—the determination of which digital assets to pre-mint may be made in various manners in various embodiments, including based on instructions received from server computing system 190, as discussed in greater detail elsewhere herein.

The TLM system 160 further stores additional data for the pre-minted digital assets on a separate ledger storage system 165 that it controls, with the ledger storage system being implemented in at least some embodiments on the one or more computing systems executing the TLM system 160 (e.g., on the one or more server computing systems 190 if they are implementing the TLM system), although in other embodiments some or all of the ledger storage may instead be accessed by the TLM system over one or more intervening computer networks. The information stored on the ledger 165 storage may include information about one or more types of access rights for each such digital asset, such as to initially indicate that the digital asset is owned by an entity (e.g., the TLM system, the associated server computing system 190, etc.) that initially has all access rights in those digital assets. As an example of an entry in the ledger storage system, a ledger entry may indicate an entity (e.g., via unique user ID) and a digital token corresponding to a digital asset in which the entity has one or more access rights. If there is only one type of access right and/or the entity has all access rights, the ledger entry may optionally not include other information, while in other situations additional types of information may be included in the ledger entry, such as information about particular access rights granted or denied the entity, a type or class of the token, and optionally other associated information (e.g., images, video, text, etc.) as discussed in greater detail below. In other embodiments, some or all such associated information for a digital asset may be stored externally to the ledger storage, such as part of digital asset information 164 stored by the TLM system and/or on the blockchain (e.g., with the digital asset information 164 including information about the types of information stored on the blockchain). In at least some embodiments, a particular digital asset may have multiple ledger entries, such as with each entry indicating a particular type of access right and associated entity that are all simultaneously valid, with a newer entry invalidating or otherwise taking precedence over an earlier entry for the same digital asset, etc.

At a time after the pre-minting of the digital assets 193, the user 105 in the example of FIG. 1A uses the client computing device 145 to perform interactions 191 over the networks 195 with the TLM system 160 and/or the server computing system 190 (e.g., with its online service), such as to request (e.g., purchase) one or more types of access rights for one or more of the pre-minted digital assets 193. In some embodiments, the user may request to obtain ownership rights to a digital asset that the user selects (e.g., to have exclusive use rights to a particular digital asset 193, to have non-exclusive rights to read and/or write and/or otherwise use a particular digital asset, etc.). In some embodiments, the user may further transmit monetary payment to the TLM system 160 and/or the server computing system 190 as part of the request, such as from a credit card, bank account, or other monetary source. If the TLM system 160 and/or server computing system 190 approves the user request, the TLM system 160 performs interactions 155 with the ledger storage 165 in order to modify the digital access rights associated with the particular digital asset, such as in a substantially immediately manner (e.g., less than one second, less than five seconds, etc.). In addition, the TLM system 160 may optionally perform further interactions 192 over the networks 195 with the blockchain storage nodes 170 in order to update corresponding information in the blockchain data 175, whether immediately or at a later time, and may optionally transfer a corresponding digital token from a digital wallet 162 to a digital wallet of the user, although in other embodiments such updating of the storage blockchain data 175 and/or transfer of digital token may not be performed at all or unless the user requests (e.g., and pays additional amounts) for such additional activities.

The server computing system(s) 190 may further perform various functionality, including providing an online service (not shown) that is available to end users. In the illustrated embodiment, the system(s) 190 store user accounts 199 for end users that use the online service, and may send instructions to the TLM system to pre-mint particular digital assets for the online service and/or to take particular actions that it approves on behalf of end users. In at least some such embodiments, the server computing system(s) 190 may further store some or all of the digital wallets 162 and/or digital asset information 164 for the digital assets that it owns, controls or otherwise manages.

It will be appreciated that the illustrated computing systems and devices in FIGS. 1A and 1B are merely illustrative and are not intended to limit the scope of the present invention. For example, network 195 may include portions of the Internet, a private network (e.g., a corporate network), a cellular network, or any other networks, including combinations of one or more such networks. In addition, client device 145 and/or other computing systems and storage nodes may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs ("application-specific integrated circuits") or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 160 and/or its components may include executable software instructions and/or data structures in at least some embodiments, which when loaded on and/or executed by particular computing systems or devices may be used to program or otherwise configure those systems or devices, such as to configure hardware processors of those systems or devices. Alternatively, in other embodiments, some or all of the software components and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) of systems 190 and/or of other systems executing the TLM system 160 and/or other hardware processor means, program the processor(s) to automatically perform the described operations for that component/system, including to use and execute routines and other algorithms as described herein. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 2:
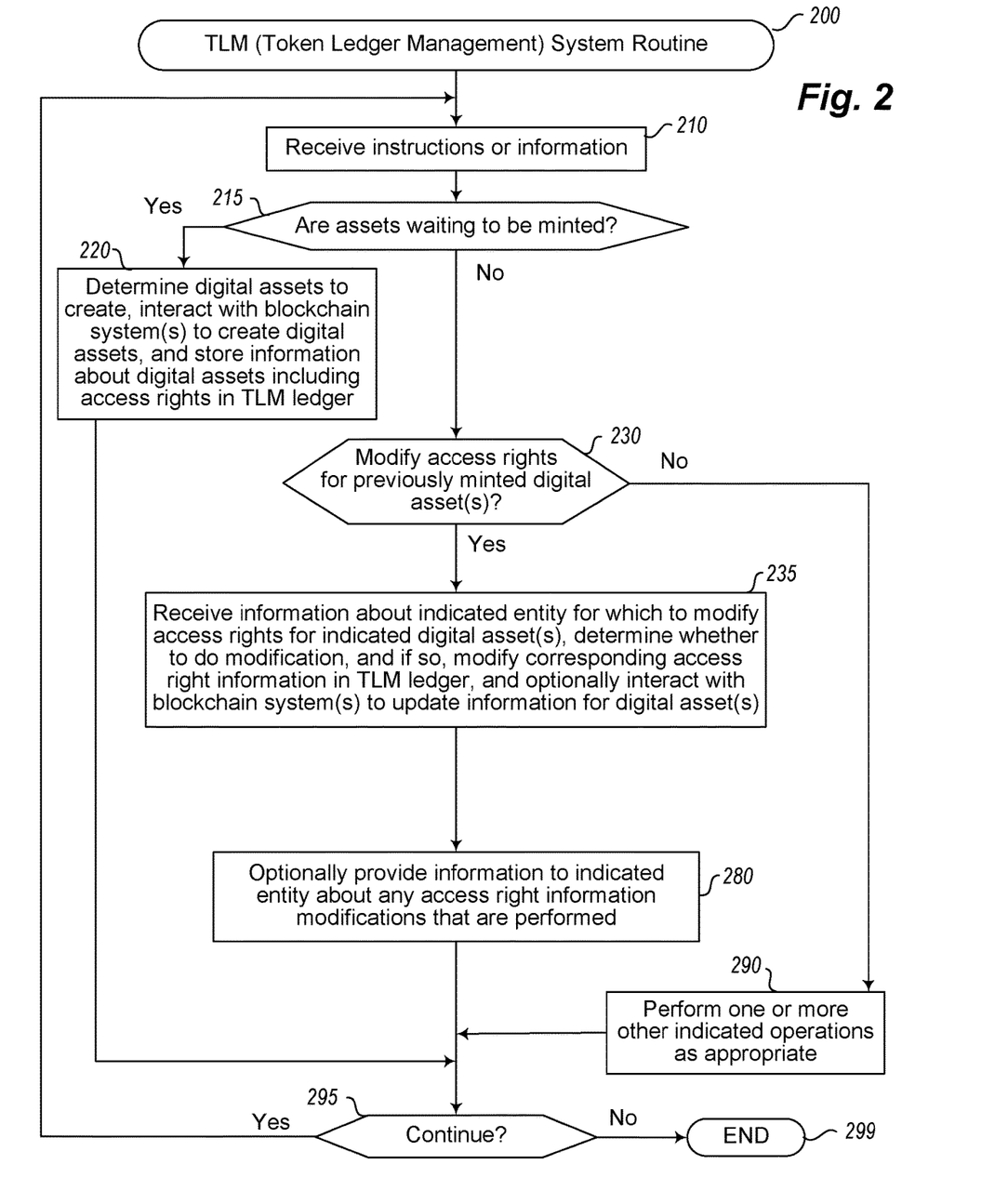
FIG. 2 illustrates a flow diagram of an example embodiment of a Token Ledger Management (TLM) System routine.

FIG. 2 illustrates a flow diagram of an example embodiment of a Token Ledger Management system routine 200. The routine may be performed by, for example, execution of the TLM system 160 of FIG. 1A and/or to provide functionality as is otherwise described in this document. While the illustrated embodiment of the routine indicates serial interactions with one or more end users and/or associated online services, it will be appreciated that some embodiments may support simultaneous access of numerous end users and/or associated online services to functionality of the system.

In the illustrated embodiment, the routine begins in block 210, where instructions or information are received, such as from an end user, an associated online service, an operator of the TLM system, etc. The routine continues to block 215 to determine whether an indication is received to pre-mint one or more digital assets, such as an instruction from an online service of an associated server computing system using functionality of the TLM system and/or from an operator of the TLM system. If so, the routine continues to block 220 to determine the one or more digital assets to create (e.g., based on the instructions received), to interact with the blockchain systems to create those digital assets, and to interact with the TLM ledger storage and optionally other storage of the TLM system (or associated online service) to store corresponding information about those digital assets, including to store information in the storage ledger about access rights initially assigned to the pre-minted digital assets.

If it is instead determined in block 215 that the instructions or information received in block 210 are not to pre-mint digital assets, the routine continues instead to block 230 to determine whether the instructions or information received in block 210 are to modify access rights for one or more digital assets, such as in response to a request from an online service on behalf of an end user or instead directly from an end user (or other entity). If so, the routine continues to block 235 to receive information about the end user or other indicated entity for which to modify access rights for one or more indicated digital assets, determines whether to perform the modification (e.g., if corresponding payment is received and/or other modification criteria are satisfied), and if so proceeds to perform the modification. The modification of the access rights includes updating corresponding access rights information stored in the TLM ledger storage, and may optionally include interacting with the blockchain systems to update corresponding information for those digital assets, whether immediately or at a later time. After block 235, the routine continues to block 280 to optionally provide information to the indicated entity and/or to the other requestor about any access right information modifications that are performed, or instead if the determination was made to not do the modification for one or more reasons. In situations in which an end user is interacting with an online service provided by a server computing system associated with the TLM system, the server computing system may receive the request from the user and send the corresponding request to the TLM system, with the server computing system receiving a response and providing corresponding information to the end user. As one example, the end user may have an account with the server computing system via which the end user can view or otherwise access digital assets according to the access rights obtained by the user for those digital assets, as discussed in greater detail elsewhere herein.

If it is instead determined in block 230 that the instructions or information received in block 210 are not to modify access rights for one or more digital assets, the routine continues instead to block 290 to perform one or more other indicated operations as appropriate. Such other operations may include, for example, receiving and storing information of various types, creating and/or modifying an end user account (e.g., if the TLM system is operating in associated with or otherwise associated with the particular server computing system), etc. In addition, such other operations may, in at least some embodiments, include receiving requests from or on behalf of an end user or other entity to access a particular digital asset (e.g., a digital asset for which the end user previously obtained access), or to determine whether the end user or other entity is authorized for a particular type of access right for a particular digital asset—if so, the routine in block 290 may retrieve corresponding access right information for the digital asset (and optionally other associated information for the digital asset that is stored in the ledger storage and/or blockchain and/or other storage of the TLM system) and provide a corresponding response, including to optionally provide any such retrieved additional information. Such a request from or on behalf of an end user (or other entity) may, for example, be to view an indicated digital asset (in which case a response may be to provide some or all of the digital asset to the end user, if the request is authorized), to modify an indicated digital asset (in which case a response may be to modify some or all of the digital asset stored on the distributed blockchain storage and/or on the ledger storage, if the request is authorized), to relinquish ownership or other existing access right(s) of the end user to an indicated digital asset (in which case a response may be to modify the corresponding access rights information stored on the ledger storage and/or on the distributed blockchain storage to effect the change, if the request is authorized), to transfer ownership or other existing access right(s) for an indicated digital asset from the end user to another indicated end user or other entity (in which case a response may be to modify the corresponding access rights information stored on the ledger storage and/or on the distributed blockchain storage to effect the change, if the request is authorized), to add additional associated stored information for an indicated digital asset (in which case a response may be to store, in association with the indicated digital asset, the additional associated information on the ledger storage and/or on the distributed blockchain storage, if the request is authorized), etc. Such a request may be made on behalf of an end user by, for example, the TLM system and/or an online service with which the end user is interacting or has interacted, such as to add information for an indicated digital asset about an associated accomplishment achieved by the end user or event in which the end user participates.

After blocks 220, 280, or 290, the routine continues to block 295, where it determines whether to continue, such as until an explicit indication to terminate is received. If it is determined to continue, the routine returns to block 210, and otherwise continues to block 299 and ends.

As discussed above, the stored digital assets or other data/digital information managed by an embodiment of the TLM system may have various forms and various embodiments, including some embodiments to be digital assets that are non-fungible and have a limited quantity of one or a defined number of digital asset instances of a particular type or class or group (e.g., a crypto-collectible). In embodiments in which an Ethereum blockchain is used, for example, such a digital asset may be represented by use of an ERC-271 token in at least some embodiments, although other types of tokens or stored groups of data may be used in other embodiments. Non-exclusive examples of such digital assets or other types of stored groups of data include a digital baseball card or other sports card for particular players and/or teams (e.g., for professional sports; amateur sports; eSports, or electronic sports; etc.), a digital collectible of other types (whether representing corresponding people and/or places and/or things in the real world or instead representing virtual people and/or places and/or things that do not have counterparts in the real world), identity information for particular users (e.g., profile information, such as demographics, preferences, etc.), property deeds, stock certificates, provenance information for valuable items, photographs or other images, user-specific emojis, etc.

As noted above, in some embodiments a server computing system may provide functionality, such as an online service, with which an end user may interact with to obtain or modify access rights in particular digital assets, such as to obtain ownership rights or an exclusive license to use one or more particular digital assets or a non-exclusive license to use one or more particular digital assets. In such embodiments, the server computing system and/or its online service may provide additional functionality, such as to allow users to view or otherwise access their digital assets, to display visual representations of the digital assets to themselves and/or others (to create and display sets of related digital assets), to use in third-party games, to export to other systems (e.g., social media sites), etc.

In addition to the digital asset itself, various other associated information may be included with or as part of a digital asset. As one non-exclusive example, if a digital asset is a collectible baseball card, additional types of information that can be stored in the TLM storage ledger and/or on the blockchain and/or on other TLM system storage may include information about the player and/or a player's team, such as charitable initiatives of the player, functionality for video chats and/or texts and/or meet-ups, information about VIP access to the player and/or the player's team, retail discounts, product placements, etc. In addition, in some embodiments functionality may be provided for an end user to obtain a digital equivalent of the player signing the user's copy of the digital baseball card, with the digital asset modified to include a verifiable or otherwise reliable indication of that "signature"—similarly, other types of information may similarly be digitally associated with the digital baseball card asset for the user (e.g., an indication of a number of games attended by the user for the team at which the player played, the user's presence at a historic event or achievement done by the player, etc.). In at least some such embodiments, additional information may be associated with the digital assets and/or provided by the TLM system or an associated server computing system, such as to associate geo-location information with a user and/or a digital asset (e.g., if a digital token is stored on a smartphone or other portable device of the user, by using GPS or other functionality of that device or of related devices, such as a cell phone network, to track the location of that device), in order to determine whether the user is present at a particular location and/or event.

In other embodiments in which such geo-location information may be used with a digital asset, the TLM system and/or an online service of an associated server computing system may provide additional associated functionality, such as to place certain digital assets in designated geographical locations so that end users can find and acquire ownership or other access rights to such digital assets.

In addition, in some embodiments the TLM system and/or an online service of an associated server computing system may provide additional functionality to an end user or other entity who owns some or all access rights for such a digital asset, such as for a user who owns one or more digital baseball cards to receive discounts or other benefits at a physical point-of-sale location associated with the player and/or the player's team (e.g., a team store retail location).

Those skilled in the art will appreciate that in some embodiments the various described systems and modules may each perform functionality that may be expressed in one or more routines, such as to perform various steps or operations in various manners (e.g., in serial or in parallel, in a synchronous or asynchronous manner, in a particular order, etc.). Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects have been discussed in specific terms such as to be described as processes and/or systems and/or may be presented at times in certain claim forms, the inventors contemplate the various aspects of the invention in any available claim form, including methods, systems, computer-readable mediums on which are stored executable instructions or other contents to cause a method to be performed and/or on which are stored one or more data structures to enable performance of such a method, etc.

What is claimed is:

1. A computer-implemented method comprising:
creating, by one or more computing systems, multiple digital assets before receiving any requests from end users for use of the digital assets, including storing each of the digital assets on a distributed blockchain storage system, and storing information about access rights for each of the multiple digital assets on a ledger storage system separate from the distributed blockchain storage system;
receiving, by the one or more computing systems, and after the creating of the multiple digital assets, a request from a first end user to obtain one or more access rights for a first digital asset of the multiple digital assets, wherein the first digital asset is a non-fungible digital cryptographic token that does not represent a monetary amount;

providing, by the one or more computing systems and in response to the request, the first end user with the one or more access rights to the first digital asset, including updating the stored information on the ledger storage system about the access rights for the first digital asset to include the one or more access rights for the first end user; and providing, by the one or more computing systems, and to the first end user based at least in part on the one or more access rights included in the stored information on the ledger storage system, access to the first digital asset in accordance with the one or more access rights, including receiving an access request from the first end user for access of an indicated type to the first digital asset, and determining, by the one or more computing systems, that the one or more access rights authorize the access of the indicated type by the first end user, and interacting with the distributed blockchain storage system to access the stored digital asset;

receiving a second access request from the first end user for access of a second indicated type to the first digital asset, and preventing, by the one or more computing systems, the first end user from obtaining the access of the second indicated type to the first digital asset based at least in part on the access of the second indicated type not being authorized by the one or more access rights; and receiving a third access request from a second end user for access of the indicated type to the first digital asset, and preventing, by the one or more computing systems, the second end user from obtaining the access of the indicated type to the first digital asset based at least in part on a determination that the stored information on the ledger storage system about the access rights for the first digital asset do not include any access rights for the second end user.

2. The computer-implemented method of claim 1 wherein the creating of the multiple digital assets is performed in response to a request from an entity that provides end users with functionality involving use of the digital assets, and wherein the providing of the first end user with the one or more access rights to the first digital asset further comprises determining, by the one or more computing systems, that the first end user has satisfied one or more defined criteria specified by the entity for obtaining the one or more access rights.

3. The computer-implemented method of claim 1 wherein the one or more access rights for the first digital asset include multiple types of access rights, wherein the updating of the stored information on the ledger storage system further includes storing an indication of the first end user in association with an identification of the one or more access rights, and wherein the providing to the first end user of the access to the first digital asset is based at least in part on the stored indication of the first end user in association with the identification of at least one of the one or more access rights that corresponds to the access of the indicated type.

4. The computer-implemented method of claim 1 wherein the provided access of the first end user of the indicated type to the first digital asset includes at least one of:

viewing the first digital asset, such that the providing of the access includes transmitting a visual representation of the first digital asset to a client device of the first end user; or modifying the first digital asset, such that the providing of the access includes receiving information from the first end user related to the first digital asset, and updating stored information for the first digital asset to reflect the received information; or transferring an indicated access right of the one or more access rights to a second end user, such that the providing of the access includes receiving information from the first end user related to the second end user and the indicated access right, and updating stored information about the access rights for the first digital asset on the ledger storage system to include the indicated access right of the second end user to the first digital asset; or associating additional information with the first digital asset, such that the providing of the access includes receiving the additional information, and updating stored information for the first digital asset on the ledger storage system to include the additional information.

5. The computer-implemented method of claim 1 further comprising:

including the first digital asset in a group of multiple other digital assets, and providing functionality to the first end user to collect all digital assets of the group; or exporting the first digital asset, from the token ledger management system, to at least one other software system implemented by at least one other computing system for use by the first end user in the at least one other software system; or providing, to the first end user at a physical location, one or more benefits that are associated with the first digital asset; or assigning multiple additional digital assets to multiple geographical locations, and providing functionality to the first end user to retrieve one or more of the multiple additional digital assets if the first end user is at one or more geographical locations to which the one or more additional digital assets are assigned.

6. A system, comprising:

one or more hardware processors of one or more computing systems;

one or more storage devices that store a ledger associated with a token ledger management system, and store an account of an end user that does not include functionality of a digital wallet;

a network interface to interact with other computing systems providing a blockchain storage system; and one or more memories with stored instructions that, when executed by at least one of the one or more processors, cause the system to perform automated operations for the token ledger management system that include at least:

creating a digital asset that is a cryptographic token, including using the network interface to store information about the digital asset on the blockchain storage system, and storing information about one or more access rights for the digital asset in the ledger on the one or more storage devices;

receiving, after the creating of the digital asset, a request to provide the end user with at least one access right for the digital asset;

updating the stored information in the ledger and the account of the end user to include the at least one access right for the end user to the digital asset; and providing, based at least in part on the at least one access right being included in the stored information on the ledger and the account of the end user, access of the end user to the digital asset in accordance with the at least one access right, including interacting with the blockchain storage system to access the cryptographic token.

7. A non-transitory computer-readable medium having stored contents that cause one or more computing systems to perform automated operations including at least:
creating, by one or more computing systems, a digital asset, including storing information about the digital asset on a blockchain storage system, and storing information about one or more access rights for the digital asset on a ledger storage system separate from the blockchain storage system, wherein the digital asset includes a cryptographic token stored on the blockchain storage system, and wherein the ledger storage system is associated with a token ledger management system;
receiving, by the one or more computing systems, and after the creating of the digital asset, a request to provide an end user with at least one access right for the digital asset;
updating, by the one or more computing systems, the stored information on the ledger storage system to include the at least one access right for the end user to the digital asset; and
providing, by the one or more computing systems, and based at least in part on the at least one access right being included in the stored information on the ledger storage system, access of the end user to the digital asset in accordance with the at least one access right,
wherein the one or more computing systems further implement the token ledger management system, wherein the token ledger management system provides an account for the end user that is used to store information for the end user about the at least one access right to the digital asset without providing functionality of a digital wallet and without using any digital credit of the end user, and wherein the providing of the access of the end user to the digital asset is performed at least in part by the token ledger management system using the information in the account for the end user to interact with the blockchain storage system and access the stored cryptographic token.

8. The non-transitory computer-readable medium of claim 7 wherein the storing of the information about the one or more access rights for the digital asset on the ledger storage system further includes storing an identifier of the token ledger management system in association with an indication of the cryptographic token in a ledger entry of the ledger storage system, and wherein the updating of the stored information on the ledger storage system includes storing an identifier of the end user in association with the indication of the digital cryptographic token.

9. The non-transitory computer-readable medium of claim 8 wherein the one or more access rights for the digital asset include multiple types of access rights, and wherein the updating of the stored information on the ledger storage system further includes storing the identifier of the end user in association with an identification of a type of the at least one access right.

10. The non-transitory computer-readable medium of claim 7 wherein the at least one access right of the end user for the digital asset includes at least one of:
viewing the digital asset, such that the providing of the access of the end user to the digital asset includes transmitting a visual representation of the digital asset to a client device of the end user; or
modifying the digital asset, such that the providing of the access of the end user to the digital asset includes receiving information from the end user related to the digital asset, and updating stored information for the digital asset to reflect the received information; or
transferring an indicated access right of the one or more access rights to a second end user, such that the providing of the access of the end user to the digital asset includes receiving information from the end user related to the second end user and the indicated access right, and updating the stored information about the access rights for the digital asset on the ledger storage system to include the indicated access right of the second end user to the digital asset; or
associating additional information with the digital asset, such that the providing of the access of the end user to the digital asset includes receiving the additional information, and updating stored information for the digital asset on the ledger storage system to include the additional information.

11. The non-transitory computer-readable medium of claim 7 wherein the blockchain storage system is implemented on a plurality of computing systems separated from the one or more computing systems by one or more computer networks, wherein the ledger storage system is implemented on the one or more computing systems, wherein the creating of the digital asset is performed as part of creating multiple digital assets before receiving any requests for use of any of the digital assets and includes the one or more computing systems interacting over the one or more computer networks with at least one of the plurality of computing systems to store each of the multiple digital assets on the blockchain storage system, and wherein each of the multiple digital assets is a non-fungible digital cryptographic token that does not represent a monetary amount.

12. The non-transitory computer-readable medium of claim 7 wherein the stored contents include software instructions that, when executed, program the one or more computing systems to perform further automated operations including at least one of:
including the digital asset in a group of multiple other digital assets, and providing functionality to the end user to collect all digital assets of the group; or
exporting the digital asset, from the token ledger management system, to at least one other software system implemented by at least one other computing system for use by the end user in the at least one other software system; or
providing, to the end user at a physical location, one or more benefits that are associated with the digital asset; or
assigning multiple additional digital assets to multiple geographical locations, and providing functionality to the end user to retrieve one or more of the multiple additional digital assets if the end user is at one or more geographical locations to which the one or more additional digital assets are assigned.

13. A non-transitory computer-readable medium having stored contents that cause one or more computing systems to perform automated operations including at least:
creating, by the one or more computing systems, a digital cryptographic token, including storing the digital cryptographic token on a blockchain storage system, and storing, in a ledger entry of ledger storage of a token ledger management system separate from the blockchain storage system, an identifier of the token ledger management system in association with an indication of the digital cryptographic token and information about multiple types of access rights for the digital cryptographic token;

receiving, by the one or more computing systems, and after the creating of the digital cryptographic token, a request to provide an end user with at least one access right for the digital cryptographic token;

updating, by the one or more computing systems, stored information on the ledger storage to include the at least one access right to the digital cryptographic token for the end user, wherein the updating of the stored information on the ledger storage includes storing an identifier of the end user in association with the indication of the digital cryptographic token and with an identification of a type of the at least one access right and with at least one of a type of the digital cryptographic token, or an image associated with the digital cryptographic token, or a video associated with the digital cryptographic token, or text associated with the digital cryptographic token, or one or more geographical locations associated with the digital cryptographic token; and providing, by the one or more computing systems, and based at least in part on the at least one access right being included in the stored information on the ledger storage, access of the end user to the digital cryptographic token in accordance with the at least one access right.

14. The non-transitory computer-readable medium of claim 13 wherein the stored contents include software instructions that, when executed, program the one or more computing systems to further store, on the ledger storage, the at least one of the type of the digital cryptographic token, or the image, or the video, or the text, or the one or more geographical locations.

15. A non-transitory computer-readable medium having stored contents that cause one or more computing systems to perform automated operations including at least:

creating, by one or more computing systems, multiple digital assets before receiving any requests for use of any of the digital assets, including interacting over one or more computer networks with at least one of a plurality of computing systems that implement a blockchain storage system to store each of the multiple digital assets on the blockchain storage system, and storing, for one of the multiple digital assets, information about one or more access rights for the one digital asset on a ledger storage system that is implemented on the one or more computing systems and is separate from the blockchain storage system, and wherein the multiple digital assets are each a non-fungible Ethereum ERC-271 digital cryptographic token;

receiving, by the one or more computing systems, and after the creating of the multiple digital assets, a request to provide an end user with at least one access right for the one digital asset;

updating, by the one or more computing systems, the stored information on the ledger storage system to include for the end user the at least one access right to the one digital asset; and providing, by the one or more computing systems, and based at least in part on the at least one access right being included in the stored information on the ledger storage system, access of the end user to the one digital asset in accordance with the at least one access right.

16. A non-transitory computer-readable medium having stored contents that cause one or more computing systems to perform automated operations including at least:

creating, by one or more computing systems, multiple digital assets before receiving any requests for use of any of the digital assets, including interacting over one or more computer networks with at least one of a plurality of computing systems that implement a blockchain storage system to store each of the multiple digital assets on the blockchain storage system, and storing, for one of the multiple digital assets, information about one or more access rights for the one digital asset on a ledger storage system that is implemented on the one or more computing systems and is separate from the blockchain storage system, and wherein the multiple digital assets are non-fungible digital cryptographic tokens that are at least one of a set of digital collectible items or a set of digital sports cards representing players;

receiving, by the one or more computing systems, and after the creating of the multiple digital assets, a request to provide an end user with at least one access right for the one digital asset;

updating, by the one or more computing systems, the stored information on the ledger storage system to include for the end user the at least one access right to the one digital asset; and providing, by the one or more computing systems, and based at least in part on the at least one access right being included in the stored information on the ledger storage system, access of the end user to the one digital asset in accordance with the at least one access right.

17. A non-transitory computer-readable medium having stored contents that cause one or more computing systems to perform automated operations including at least:

creating, by one or more computing systems, multiple digital assets before receiving any requests for use of any of the digital assets, including interacting over one or more computer networks with at least one of a plurality of computing systems that implement a blockchain storage system to store each of the multiple digital assets on the blockchain storage system, and storing, for one of the multiple digital assets, information about one or more access rights for the one digital asset on a ledger storage system that is implemented on the one or more computing systems and is separate from the blockchain storage system, and wherein the multiple digital assets are each a non-fungible digital cryptographic token that represents at least one of a property deed, or a stock certificate, or provenance information for a physical item, or an image, or an emoji created by an end user, or one or more types of identity information for an end user; and receiving, by the one or more computing systems, and after the creating of the multiple digital assets, a request to provide an end user with at least one access right for the one digital asset;

updating, by the one or more computing systems, the stored information on the ledger storage system to include for the end user the at least one access right to the one digital asset; and providing, by the one or more computing systems, and based at least in part on the at least one access right being included in the stored information on the ledger storage system, access of the end user to the one digital asset in accordance with the at least one access right.

18. The system of claim 6 wherein the stored instructions include software instructions that, when executed, program the system to perform further automated operations including at least one of:
- including the digital asset in a group of multiple other digital assets, and providing functionality to the end user to collect all digital assets of the group; or
- exporting the digital asset, from the token ledger management system, to at least one other software system implemented by at least one other computing system for use by the end user in the at least one other software system; or
- providing, to the end user at a physical location, one or more benefits that are associated with the digital asset; or
- assigning multiple additional digital assets to multiple geographical locations, and providing functionality to the end user to retrieve one or more of the multiple additional digital assets if the end user is at one or more geographical locations to which the one or more additional digital assets are assigned.

19. The system of claim 6 wherein the creating of the digital asset is performed as part of creating multiple digital assets before receiving any requests for use of any of the digital assets and includes the system interacting over one or more computer networks with at least one computing system to store each of the multiple digital assets on the blockchain storage system, and wherein each of the multiple digital assets is a non-fungible digital cryptographic token that does not represent a monetary amount.

20. The system of claim 6 wherein the one or more access rights for the digital asset include multiple types of access rights, wherein the updating of the stored information on the ledger further includes storing an indication of the end user in association with an identification of the one or more access rights, and wherein the providing to the end user of the access to the digital asset is based at least in part on the stored indication of the end user in association with the identification of at least one of the one or more access rights that corresponds to the access of the indicated type.

21. The system of claim 6 wherein the provided access of the end user to the digital asset includes at least one of:
- viewing the digital asset, such that the providing of the access includes transmitting a visual representation of the digital asset to a client device of the end user; or
- modifying the digital asset, such that the providing of the access includes receiving information from the end user related to the digital asset, and updating stored information for the digital asset to reflect the received information; or
- transferring an indicated access right of the one or more access rights to a second end user, such that the providing of the access includes receiving information from the end user related to the second end user and the indicated access right, and updating stored information about the access rights for the digital asset on the ledger to include the indicated access right of the second end user to the digital asset; or
- associating additional information with the digital asset, such that the providing of the access includes receiving the additional information, and updating stored information for the digital asset on the ledger to include the additional information.

\* \* \* \* \*